Patented Feb. 21, 1939

2,148,381

UNITED STATES PATENT OFFICE 2,148,381

LIQUID PLASTIC AND THE METHOD OF APPLYING A PLASTIC COATING

Lester V. Slauter, Highland Park, and Harry Salter, Detroit, Mich., assignors to Michigan Cellulose Corporation, Detroit, Mich., a corporation of Michigan No Drawing. Application February 27, 1936, Serial No. 66,054

3 Claims. (Cl. 134—79)

This invention relates to improvements in cellulose derivative plastic material coatings utilizing nitrocellulose, cellulose aceate, or a combination of both, and the method of applying a plastic material coating to an article.

The principal object of this invention is to provide a liquid plastic material, utilizing nitrocellulose and/or cellulose acetate, to be applied to an article, to form an enclosing protective and decorative envelope.

A main object is to provide a new method whereby in a single application a plastic coating of substantial thickness is applied to the article.

Another object is to provide a viscous plastic solution, the ingredients of which remain in suspension indefinitely, that can be applied to an article while in a liquid state.

A further object is to provide a plastic material coating for an article, utilizing nitrocellulose and/or cellulose acetate, in a liquid state to form a coating of substantial thickness.

Other objects are: to provide a plastic material utilizing nitrocellulose and/or cellulose acetate with suitable solvents to form a liquid solution; to provide in a plastic material certain ingredients that will permit a coating of uniform and substantial thickness to be applied to an article having irregular convolutions; to provide in such a plastic coating certain characteristics whereby it will not while drying, shrink to the extent that it will pull away and separate from the coated article at the bottom of depressions, or tend to reduce the coating thickness at the top of projections on the article; to provide in a plastic material utilizing nitrocellulose and/or cellulose acetate certain characteristics whereby the shrinkage of the material while drying may be controlled; to provide in such a plastic material certain ingredients whereby the material may be applied in a liquid state, and upon drying obtain physical characteristics superior to the heretofore known molded, formed or extruded plastic cellulose nitrate or plastic cellulose acetate; to provide a liquid plastic material incorporating nitrocellulose and/or cellulose acetate dissolved in suitable solvents, that will permit its application to the article and drying in a normal room temperature and humidity, therefore, being particularly adapted for economical commercial use, the resultant coating of the finished article having superior physical properties and an enhanced appearance over those of other known plastics; to provide in a plastic material incorporating nitrocellulose and/or cellulose acetate, certain ingredients whereby the degree of hardness and elasticity of the resultant coating on the article may be controlled; to provide a plastic material that while in a liquid state can be applied to an article and dried or cured in normal room temperature and humidity environment without special atmospheric conditioning process; and to provide a novel and economical method of applying a plastic coating to an article, all of which are attained by our invention.

It is known that a heavy plastic coating may be applied to an article by extruding the plastic material over the article to encase it; or the material may be moulded around the article; or the more common method of applying multiple thin coatings to build up a coating of required thickness may be used. These methods are not only costly but they require much time and skill, together with elaborate and costly operating equipment, all of which tend to limit their commercial application.

Some of the known materials used in attempting to obtain a thick or heavy coating to envelop an article from a viscous nitrocellulose solution, necessitate controlled temperature and humidity, otherwise many defectively coated articles would be obtained. The majority of such defects being: That upon the rapid evaporation of the solvent, a refrigerating effect is produced, causing a precipitation of moisture from the surrounding atmosphere to collect on the newly coated surface resulting in a rough, streaked and discolored coating; or due to the surrounding atmosphere, the solvents of the immediate exterior of the newly coated surface evaporate, leaving an impenetrable surface film and the solvent that is trapped beneath this surface film vaporizes or boils, forming an unshapely wrinkled or blistered effect upon the surface of the coating. It has been found that when using controlled temperature and humidity, if the object being coated possesses a surface of fine detail, such as engraving or embossing, the coating when applied from a viscous solution will, upon drying, stretch away from the depressions, thus almost obliterating the details of the design. In an attempt to overcome these defects, various curing and drying processes have been tried, but heretofore none have proven entirely successful. Such objectionable features, as above enumerated, are avoided by our invention.

We have found that, by treating the nitrocellulose, cellulose acetate, or the plastic cellulose derivative, with a solution of combined solvents, latent-solvents, and diluents in such a manner that the last solvent to vaporize is non-hygroscopic in character, we obtained a viscous liquid plastic solution that is commercially practical because temperature and/or humidity control are not necessary in curing or drying the liquid plastic coating.

Further, that by treating the nitrocellulose, cellulose acetate, or the plastic cellulose derivative with a solution of combined solvents as: (1) a solvent of low boiling point, such as an aliphatic ketone or an aliphatic ester to act as a vehicle solvent, (2) a solvent, such as an aliphatic alcohol of low boiling point, but higher than the aforementioned solvent to act as a latent solvent as solvent (1) evaporates, and (3) a non-hygroscopic hydrocarbon solvent, such as a non-hygroscopic hydrocarbon with a medium boiling point, higher than the preceding solvents, the resulting liquid plastic does not require a curing or drying process, after it has been applied to the article.

Still further we have found that, the non-hygroscopic hydrocarbon solvent (3) with a medium boiling point, but a higher boiling point than the preceding latent solvent, will act first, as a diluent, second, because of its non-hygroscopic nature, will render the condensed moisture on the coating surface ineffective, and third, as a jelling agent when the vehicle solvent and the latent solvent have evaporated. We have thus obtained a liquid plastic in the state of a viscous solution that attains the objects relative to the material hereinbefore enumerated.

More specifically, we have found that, by treating a quantity of one-half to three and one-half pounds of nitrocellulose, cellulose acetate, or the plastic cellulose derivative with a solution of combined solvents comprising (1) 50 to 90% acetone, ethyl methyl ketone, or ethyl acetate, (2) 5 to 25% ethyl alcohol, propyl alcohol, iso-propyl alcohol, butyl alcohol, or iso-butyl alcohol, and (3) 5 to 25% benzene, toluene, xylene, saturated naptha, or unsaturated naptha, to form a gallon of solution, the resultant liquid plastic in the state of a viscous solution, when applied to an article produces a heavy coating, the thickness of which can be varied as desired and does not require a curing or drying process after its application to the article.

The viscosity of the liquid plastic, for the purpose herein later described, may be varied by altering the above mentioned proportion of solids and solvents.

The ingredients of the solution, also the quantity of each ingredient, to attain various drying characteristics, may be combined as desired within the range and percentages above mentioned.

By way of example, but not of limitation, the following formula of a liquid plastic material successfully used, is given:

1½ pounds plastic cellulose derivative, such as pyroxylin, dissolved in solvents in the proportion of 80% acetone; 10% iso-propyl alcohol, and 10% toluene, to form one gallon of solution.

As will be seen from the foregoing specific example, acetone, which is used as the vehicle solvent hereinbefore described under (1), is a solvent of low boiling point, namely, 56.5° C. The iso-propyl alcohol which acts as a latent solvent as described under (2) during the time solvent (1) evaporates, has a boiling point of 82.3° C., and the toluene, which forms the non-hygroscopic (3) with a medium boiling point, has a boiling point of 110.8° C. The boiling points above given are known specific properties of the solvents named, as can be readily established by reference to any standard reference book.

From the nature of the solvents herein enumerated it is obvious that additional agents such as plasticizers, drying oils, gums, and natural or synthetic resins may be added to vary the characteristics of the liquid plastic, and it is our intention that the addition of such agents which are miscible with the ingredients above enumerated is not to be construed as a departure from the spirit and scope of our invention.

The liquid plastic above described may be applied to metallic or wooden articles, glass, rubber, leather, compounded substances, paper, fabric, or similar articles by immersing the article in the liquid plastic solution of predetermined viscosity and then withdrawing the said article from the solution and allowing it to dry in a normal room temperature and atmosphere.

When the plastic material has been prepared as above described with solvents having the characteristics set forth the vehicle solvent (1) which in the specific example is acetone, will evaporate quite rapidly at ordinary room temperature without necessitating the use of any baking or forced drying step. During the evaporation of the acetone, solvent (2) iso-propyl alcohol and solvent (3) toluene remain relatively latent. The more rapid evaporation of the acetone results in forming what may be termed a confining film on both the inner and outer surface of the coating, while the non-evaporation or the relatively slight degree of evaporation of the iso-propyl alcohol and toluene tend to keep the plastic material confined between the inner and outer films in a jelled condition. As the toluene solvent (3) is non-hygroscopic it will in addition to acting as a jelling agent during the evaporation of solvent (1) (acetone) render any condensed moisture on the coating surface ineffective. This is due to the fact that as the solvents employed are of low boiling points the evaporation takes place quite rapidly and by the time the cooling or refrigerating effect of the evaporation has proceeded to a point such as would ordinarily cause precipitation of atmospheric moisture upon the article to be coated, the evaporation has proceeded down to the toluene content which, because of its non-hygroscopic properties, prevents marks appearing on the finished surface, which would otherwise be caused by such condensation. Therefore it has been found in actual practice with the present invention unnecessary to resort to such steps as have heretofore been thought necessary, such as carefully controlled temperature and humidity. As will also be seen when the solvents are carefully selected in accordance with the foregoing disclosure so that all are of low boiling points but selected so that the main vehicle solvent (1) the latent solvent (2), and the non-hygroscopic solvent (3) evaporate in succession in the order given, unexpected and desirable results are obtainable in commercial practice. The formation of the confining films on the outer and inner surfaces between which the remaining solvent is confined in a jelled condition enables the adherent coating to flow between the confining films and automatically adjust itself to the exact contour of the article coated thereby to insure a relatively uniform thickness of coating.

The thickness of the coating, which is relatively of greater thickness than that which can be obtained by the use of the commonly known paints or lacquers by means of a single immersion or application is controlled by the viscosity of the liquid plastic solution and/or by the rate of speed at which the article is withdrawn from the solution.

The coating is maintained of uniform thickness by maintaining a uniform rate of speed while withdrawing the article from the solution, or the thickness of the coating may be varied by varying the rate of speed while withdrawing the article.

Thus a coating of gradually tapering thickness and/or varying translucency, or a coating of intermittently varying thickness and/or translucency may be applied to the article.

We claim:

1. A plastic material essentially comprising a plastic cellulose derivative dissolved in a solvent mixture consisting of acetone, iso-propyl alcohol and toluene, forming a viscous solution.

2. A plastic material essentially comprising a cellulose derivative dissolved in a solvent mixture consisting of acetone, iso-propyl alcohol, and toluene, forming a viscous solution, the acetone comprising approximately 80% of such solvent mixture, the iso-propyl alcohol approximately 10%, and the toluene approximately 10%.

3. A plastic material essentially comprising a cellulose derivative dissolved in a solvent mixture consisting of acetone, iso-propyl alcohol, and toluene, forming a viscous solution, the acetone comprising from 50% to 90% of such solvent mixture, the iso-propyl alcohol from 5% to 25% thereof, and the toluene from 5% to 25%.

LESTER V. SLAUTER.
HARRY SALTER.